(12) United States Patent
Shen et al.

(10) Patent No.: US 11,450,848 B2
(45) Date of Patent: Sep. 20, 2022

(54) METHOD OF PREPARING LITHIUM ION BATTERY CATHODE MATERIALS

(71) Applicant: GRST International Limited, Hong Kong (HK)

(72) Inventors: Peihua Shen, Guangdong (CN); Sing Hung Eric Wong, Hong Kong (HK)

(73) Assignee: GRST International Limited, Hong Kong (HK)

( * ) Notice: Subject to any disclaimer, the term of this patent is extended or adjusted under 35 U.S.C. 154(b) by 41 days.

(21) Appl. No.: 16/867,572

(22) Filed: May 6, 2020

(65) Prior Publication Data
US 2020/0280058 A1 Sep. 3, 2020

Related U.S. Application Data (62) Division of application No. 15/780,238, filed as application No. PCT/CN2016/107279 on Nov. 25, 2016, now Pat. No. 10,686,188.

(60) Provisional application No. 62/274,385, filed on Jan. 4, 2016.

(51) Int. Cl.
| H01M 4/36 | (2006.01) |
| C01G 53/00 | (2006.01) |
| H01M 4/505 | (2010.01) |
| H01M 4/525 | (2010.01) |

(Continued)

(52) U.S. Cl.
CPC .......... *H01M 4/366* (2013.01); *C01G 53/006* (2013.01); *C01G 53/50* (2013.01); *H01M 4/505* (2013.01); *H01M 4/525* (2013.01); *H01M 10/0525* (2013.01); *C01P 2004/51* (2013.01); *C01P 2004/61* (2013.01); *C01P 2004/84* (2013.01); *C01P 2006/12* (2013.01);

(Continued)

(58) Field of Classification Search
CPC .. H01M 4/366; H01M 10/0525; H01M 4/505; H01M 4/525; H01M 2004/021; H01M 2004/028; C01G 53/006; C01G 53/50; C01G 49/02; C01P 2006/12; C01P 2004/51; C01P 2004/84; C01P 2006/40; C01P 2004/61; Y02E 60/10
See application file for complete search history.

(56) References Cited

U.S. PATENT DOCUMENTS

| 2014/0057175 A1* | 2/2014 | Chung | H01M 4/366 427/126.6 |
| 2014/0234715 A1* | 8/2014 | Fasching | H01M 4/04 429/220 |
| 2015/0364761 A1* | 12/2015 | Fukui | H01M 4/525 429/223 |

FOREIGN PATENT DOCUMENTS

| JP | 2012252844 A | 12/2012 |
| WO | 2014061579 A1 | 4/2014 |

* cited by examiner

*Primary Examiner* — Andrew J. Oyer (57) ABSTRACT

Provided herein is a method for preparing a surface modified cathode material for lithium-ion battery, wherein the cathode material comprises lithium multi-metal composite oxide particles capped with a thin film of an oxide of the metal, wherein the lithium multi-metal composite oxide is represented by $Li_{1+z}Ni_xMn_yCo_{1-x-y}O_2$; and wherein z is from 0 to 0.2; x is from 0.35 to 0.8; y is from 0.1 to 0.45; and the metal is one or more elements selected from the group consisting of Fe, Mn, Al, Mg, Zn, Ti, La, Ce, Sn, Zr, Ru and combination thereof. The cathode material disclosed herein exhibits a high initial specific capacity from 150 mAh/g to (Continued)

200 mAh/g, possesses good safety characteristics and shows impressive energy retention of about 91% after 1000 cycles.

16 Claims, 5 Drawing Sheets

(51) Int. Cl.
  *H01M 10/0525* (2010.01)
  *H01M 4/02* (2006.01)
(52) U.S. Cl.
  CPC ... *C01P 2006/40* (2013.01); *H01M 2004/021* (2013.01); *H01M 2004/028* (2013.01)

METHOD OF PREPARING LITHIUM ION BATTERY CATHODE MATERIALS

CROSS-REFERENCE TO RELATED APPLICATIONS

This application is a divisional of U.S. application Ser. No. 15/780,238, filed May 31, 2018, which is a national stage application of International Patent Application No. PCT/CN2016/107279, filed Nov. 25, 2016, which claims the benefit of U.S. Provisional Application No. 62/274,385, filed Jan. 4, 2016, all of which are incorporated herein by reference in their entireties.

FIELD OF THE INVENTION

This invention relates to lithium-ion batteries in the application of sustainable energy area. More particularly, this invention relates to methods of preparing surface modified electrode materials having specific compositions.

BACKGROUND OF THE INVENTION

In the past decades, lithium-ion batteries (LIBs) have been widely utilized in various applications especially consumer electronics because of their superior energy density, long cycle life and discharging capability. LIBs generally include an anode, an electrolyte, and a cathode that contains lithium in the form of a lithium-transition metal oxide, such as $LiCoO_2$, $LiNiO_2$ and $LiMn_2O_4$.

Currently, LIBs mostly utilize metal oxides as cathode material with $LiCoO_2$ as the most popular and commercially successful representative. However, due to the intrinsic material properties of this cathode material, besides the toxicity and high material cost of cobalt, further enhancement of performance of LIBs is also limited. $LiNiO_2$ is characterized for its high specific capacity up to 180 mAh/g. But its application is limited to experimental research because of difficulties in synthesis and safety concerns due to thermal runaway reaction. $LiMn_2O_4$ has been considered as a promising cathode material due to its advantages of high stability and low cost. However its low charge capacity and inferior cycling performance, especially under high temperatures, limit the application of this material to small electrokinetic cells.

In recent years, a multi-element lithium transition metal oxide (LNMC) such as ternary transition metal oxides in the form of $Li[Ni_xMn_yCo_{1-x-y}O_2]O_2$ has been proposed to replace $LiCoO_2$. LNMC adopts the $\alpha$-$NaFeO_2$ type structure and can be regarded as the partial substitution of $Ni^{2+}$ and $Mn^{4+}$ (1:1) for $Co^{3+}$ in $LiCoO_2$. This multi-element transition metal oxide as cathode material is expected to leverage merits of each component material and might even prevail in the overall performance, because of the synergy effect of the three transition metal ions and the flexibility of composition. Therefore, $LiCoO_2$ is gradually replaced by the ternary transition metal oxides especially in applications that require high power output.

However, in the case of using lithium ternary transition metal oxide ($LiNi_xMn_yCo_{1-x-y}O_2$) as a cathode active material, there are still some drawbacks in the Li-ion batteries to be improved, for instance, phase transformation, safety issue about thermal instability, and deterioration of capacity after repeated charge and discharge cycles.

Different attempts have been made to solve the problems and improve the performance of $LiNi_xMn_yCo_{1-x-y}O_2$ as cathode material, including particle size control (see Shaju et al., *Macroporous $Li(Ni_{1/3}Co_{1/3}Mn_{1/3})O_2$: A high-power and high-energy cathode for rechargeable lithium batteries*, Advanced Materials, 2006, 18, 17, 2330), lattice doping (see Hong et al., *Nano SIMS characterization of boron-and aluminum-coated $LiNi_{1/3}Co_{1/3}Mn_{1/3}O_2$ cathode materials for lithium secondary ion batteries*, Journal of Applied Electrochemistry, 2011, 42, 1, 41) and surface modification (see Song et al., *Enhanced electrochemical and storage properties of $La_{2/3-x}Li_{3x}TiO_3$-coated $Li[Ni_{0.4}Co_{0.3}Mn_{0.3}O_2]$*, Electrochimica Acta, 2011, 56, 20, 6896). The coated cathode reported by Song et al. demonstrated an enhanced rate capability, discharge capacity, thermal stability and cyclic performance through structural stabilization and the overall performance is generally more effective than particle size control and lattice doping. However, this method is not suitable for industrial scale-up for producing the coated cathode on a large scale. Besides, the cycle life using this cathode material so far is less than 50 cycles in terms of 20% loss of its initial capacity, which is insufficient for many intended applications such as portable electronics and electric vehicles.

U.S. Pat. No. 7,678,503 B2 describes a method of modifying a layered oxide with a metal oxide by dispersing a $(1-x)Li[Li_{1/3}Mn_{2/3}]O_2 \cdot xLi[Mn_{0.5-y}Ni_{0.5-y}Co_{2y}]O_2$ composition in a metal salt precursor solution. Ammonium hydroxide is added to the metal salt precursor solution to precipitate a metal hydroxide. The layered oxide containing the metal hydroxide is then heated to obtain a surface modified layered oxide. The surface modification offers the advantage of improving the cycling capacity retention. However, the cycle life using this cathode material so far is less than 200 cycles, and thus still insufficient for actual applications.

U.S. Pat. No. 8,883,352 B2 discloses a method for producing a surface modified lithium-containing composite oxide represented by $Li_wN_xM_yO_zF_a$, wherein N is at least one element selected from the group consisting of Co, Mn and Ni, and M is at least one element selected from the group consisting of Al, Zn, Sn, an alkaline earth metal element and a transition metal element other than Co, Mn and Ni. The surface modified lithium-containing composite oxide shows improved capacity and thermal stability. However, this surface modified lithium-containing composite oxide has no sufficient performance from the viewpoint of the battery performance especially the durability for charge and discharge cycles.

In view of the above, there is always a need to develop a method for preparing a surface modified ternary transition metal oxide as a cathode material for lithium-ion batteries with high charging/discharging capacity, improved safety and excellent cycling durability under fast charge/discharge conditions.

SUMMARY OF THE INVENTION

The aforementioned needs are met by various aspects and embodiments disclosed herein.

In one aspect, provided herein is a method of preparing a cathode material for a lithium-ion battery cell, comprising the steps of:

1) dissolving a salt of nickel, a salt of manganese, and a salt of cobalt in de-ionized water to obtain an aqueous solution, wherein a molar ratio of the metal elements Ni to Mn to Co is 1.2-7.2 to 1.5-3.1 to 1-2.2;

2) adding the aqueous solution into an alkaline solution to form a suspension of multi-element metal hydroxide particles;

3) adding a solution of a salt of a metal into the suspension to form a solid product comprising a precipitate of a hydroxide of the metal on the surface of the multi-element metal hydroxide particles;

4) drying the suspension containing the solid product to obtain a multi-element precursor;

5) mixing the multi-element precursor with one or more lithium salts to obtain a first mixture, wherein a molar ratio of the metal element Li to a total amount of the metal elements Ni, Mn, Co and the metal is 1.02-1.2 to 1;

6) dispersing the first mixture in an aqueous solvent to form a slurry;

7) homogenizing the slurry by a homogenizer;

8) drying the slurry to obtain a solid mixture;

9) calcinating the solid mixture under an atmosphere with an oxygen content higher than 21% at a temperature from about 600° C. to about 900° C. for a time period from about 4 hours to about 12 hours to obtain a calcinated product; and 10) cooling the calcinated product to room temperature, crushing the calcinated product, and isolating particles of the calcinated product having an average particle size D50 in the range from about 5 μm to about 15 μm to obtain the cathode material, wherein the cathode material comprises lithium multi-metal composite oxide particles capped with a thin film of an oxide of the metal, wherein the lithium multi-metal composite oxide is represented by $Li_{1+z}Ni_xMn_yCo_{1-x-y}O_2$; and wherein z is from 0 to 0.2; x is from 0.35 to 0.8; y is from 0.1 to 0.45; and the metal is one or more elements selected from the group consisting of Fe, Mn, Al, Mg, Zn, Ti, La, Ce, Sn, Zr, Ru and combinations thereof.

In certain embodiments, a total molar concentration of the metal elements in the aqueous solution is from about 0.9 mol/L to about 1.6 mol/L. In some embodiments, the alkaline solution comprises a base selected from the group consisting of LiOH, NaOH, KOH, $NH_3 \cdot H_2O$, $Be(OH)_2$, $Mg(OH)_2$, $Ca(OH)_2$, $Li_2CO_3$, $Na_2CO_3$, $NaHCO_3$, $K_2CO_3$, $KHCO_3$, $(CH_3)_4NOH$ and combinations thereof.

In some embodiments, a pH value in step 2) is maintained at a range from about 10 to about 12 by addition of the alkaline solution and the solution is stirred for a time period from about 15 minutes to about 2 hours.

In certain embodiments, the salt of nickel, the salt of manganese, the salt of cobalt, and the salt of the metal comprise an anion selected from the group consisting of sulfate, nitrate, acetate, chloride and combinations thereof.

In some embodiments, a molar concentration in the solution of the salt of the metal is from about 0.1 mol/L to about 0.5 mol/L and the solution is stirred for a time period from about 15 minutes to about 2 hours.

In certain embodiments, the suspension containing the solid product can be dried by a spray dryer to obtain a multi-element precursor.

In some embodiments, the solid product is separated from the suspension before drying and the solid product is dried by a microwave dryer or a microwave vacuum dryer to obtain a multi-element precursor.

In certain embodiments, the lithium salt is LiOH, $Li_2CO_3$, LiF or a combination thereof. In some embodiments, the aqueous solvent for dispersing the first mixture is water, ethanol, isopropanol, butanol or a combination thereof.

In some embodiments, the homogenizer is a blender, a mill, an ultrasonicator, a rotor-stator homogenizer, or a high pressure homogenizer. In further embodiments, the ultrasonicator is a probe-type ultrasonicator or an ultrasonic flow cell. In still further embodiments, the ultrasonicator is operated at a power density from about 10 W/L to about 100 W/L, or from about 40 W/L to about 60 W/L.

In certain embodiments, wherein the slurry is homogenized for a time period from about 1 hour to about 10 hours, or a time period from about 2 hours to about 4 hours.

In some embodiments, the drying process in step 8) is performed by a double-cone vacuum dryer, a microwave dryer, or a microwave vacuum dryer.

In certain embodiments, the solid mixture has an average particle size D50 in the range from about 1 μm to about 10 μm.

In some embodiments, the calcination process is performed by a push-plate tunnel furnace, or a rotary furnace.

In certain embodiments, the crushing process is performed by a ball mill, hammer mill, a jet mill, or a high pressure dispersion mill.

In some embodiments, the isolating step is performed by passing through a mesh sieve having a range from about 200 to about 400.

In certain embodiments, the thin film of the oxide of the metal capped on the surface of the multi-metal composite oxide particles has a thickness from about 500 nm to about 1 μm.

DETAILED DESCRIPTION OF THE INVENTION

Provided herein is a method of preparing a cathode material for a lithium-ion battery cell, comprising the steps of:

1) dissolving a salt of nickel, a salt of manganese, and a salt of cobalt in de-ionized water to obtain an aqueous solution, wherein a molar ratio of the metal elements Ni to Mn to Co is 1.2-7.2 to 1.5-3.1 to 1-2.2;

2) adding the aqueous solution into an alkaline solution to form a suspension of multi-element metal hydroxide particles;

3) adding a solution of a salt of a metal into the suspension to form a solid product comprising a precipitate of a hydroxide of the metal on the surface of the multi-element metal hydroxide particles;

4) drying the suspension containing the solid product to obtain a multi-element precursor;

5) mixing the multi-element precursor with one or more lithium salts to obtain a first mixture, wherein a molar ratio of the metal element Li to a total amount of the metal elements Ni, Mn, Co and the metal is 1.02-1.2 to 1;

6) dispersing the first mixture in an aqueous solvent to form a slurry;

7) homogenizing the slurry by a homogenizer;

8) drying the slurry to obtain a solid mixture;

9) calcinating the solid mixture under an atmosphere with an oxygen content higher than 21% at a temperature from about 600° C. to about 900° C. for a time period from about 4 hours to about 12 hours to obtain a calcinated product; and 10) cooling the calcinated product to room temperature, crushing the calcinated product, and isolating particles of the calcinated product having an average particle size D50 in the range from about 5 μm to about 15 μm to obtain the cathode material, wherein the cathode material comprises lithium multi-metal composite oxide particles capped with a thin film of an oxide of the metal, wherein the lithium multi-metal composite oxide is represented by $Li_1Ni_xMn_yCo_{1-x-y}O_2$; and wherein z is from 0 to 0.2; x is from 0.35 to 0.8; y is from 0.1 to 0.45; and the metal is one or more elements selected from the group consisting of Fe, Mn, Al, Mg, Zn, Ti, La, Ce, Sn, Zr, Ru and combinations thereof.

The term "alkaline solution" refers to a solution of a soluble base, having a pH greater than 7.0, greater than 7.5, greater than 8.0, greater than 9.0, greater than 10.0, greater than 11.0, or greater than 12.0. In some embodiments, the pH is less than 12.0, less than 11.0, less than 10.0, less than 9.0, or less than 8.0.

The term "base" includes any molecule or ion that can accept protons from any proton donor, and/or contain completely or partially displaceable $OH^-$ ions. Some non-limiting examples of suitable bases include alkali metal hydroxides (e.g., NaOH, LiOH and KOH), alkaline earth metal hydroxides (e.g., $Ca(OH)_2$), an ammonia solution (e.g., $NH_4OH$), alkali metal carbonates (e.g., $Na_2CO_3$ and $K_2CO_3$), alkali hydrogen carbonates (e.g., $NaHCO_3$ and $KHCO_3$), organic base (e.g., $(CH_3)_4NOH$ and polyethylene glycol) and mixtures thereof.

The term "spray dryer" refers to an equipment used for producing a dry powder from a liquid or slurry by rapidly drying with a hot gas. All spray dryers use some type of atomizer or spray nozzle to disperse the liquid or slurry into a controlled drop size spray. Some non-limiting examples of the atomizer include rotary atomizers and Pulse Jet atomizers. Some non-limiting examples of the nozzle include 2-fluid nozzles, pressure nozzles and Twin-Jet nozzles.

The term "dry-powder" refers to any solid material obtained by continuous drying, e.g., spray-drying or fluidized bed drying of a non-aqueous solution or of an aqueous solution or of a combination of an aqueous and non-aqueous solutions. The non-aqueous solution can contain one or more non-aqueous solvents.

The term "homogenizer" refers to an equipment that can be used for homogenization of materials. The term "homogenization" refers to a process of distributing a mixture of two or more substances or materials uniformly throughout a fluid. Any conventional homogenizers can be used for the method disclosed herein. Some non-limiting examples of the homogenizer include blenders, mills, ultrasonicators, rotor-stator homogenizers and high pressure homogenizers.

The term "milling" refers to a process whereby particles are reduced in size by impact with rapidly moving surfaces in a mill. In some embodiments, the mill is a ball mill, a bead mill, a jet mill or a disc mill.

The term "hammer mill" refers to a device that has rapidly rotating hammers that strike particles repeatedly until the particles are reduced to a size that can pass through a nearby screen.

The term "jet mill" refers to a device for decreasing the size of a particulate substance. The particles to be ground are suspended in flowing air streams and the entrained and supersonically moving particles are then directed at a target or at themselves resulting in a fine grind without media or added solvents.

The term "high pressure dispersion mill" refers to a device for carrying out a particle size reduction process in which dispersions are pressurized to 10,000-50,000 psi and then the pressure is rapidly released resulting in cavitations and grinding.

The term "ultrasonicator" refers to an equipment that can apply ultrasound energy to agitate particles in a sample. Any ultrasonicator that can disperse the first mixture in the slurry can be used herein. Some non-limiting examples of the ultrasonicator include an ultrasonic bath, a probe-type ultrasonicator and an ultrasonic flow cell.

The term "ultrasonic bath" refers to an apparatus through which the ultrasonic energy is transmitted via the container's wall of the ultrasonic bath into the liquid sample.

The term "probe-type ultrasonicator" refers to an ultrasonic probe immersed into a medium for direct sonication. The term "direct sonication" means that the ultrasound is directly coupled into the processing liquid.

The term "ultrasonic flow cell" or "ultrasonic reactor chamber" refers to an apparatus through which sonication processes can be carried out in a flow-through mode. In some embodiments, the ultrasonic flow cell is in a single-pass, multiple-pass or recirculating configuration.

The term "furnace" refers to a device used for high-temperature heating.

The term "overs" refers to oversized particles that cannot pass through the screen.

The term "unders" refers to particles having a mesh size smaller than said mesh size of said separation screen.

The term "average particle size D50" refers to a volume-based accumulative 50% size (D50) which is a particle size at a point of 50% on an accumulative curve when the accumulative curve is drawn so that a particle size distribution is obtained on the volume basis and the whole volume is 100%. Further, with respect to the surface modified lithium-containing composite oxide of the present invention, the average particle size D50 means a volume-averaged particle size of secondary particles which are formed by mutual agglomeration and sintering of primary particles, and in a case where the particles are composed of the primary particles only, it means a volume-averaged particle size of the primary particles. Furthermore, D10 means a volume-based accumulative 10% size, and D90 means a volume-based accumulative 90% size.

The term "capped with a film" refers to overlain by a layer or coated with a layer.

The term "C rate" refers to the charging or discharging rate of a cell or battery, expressed in terms of its total storage capacity in Ah or mAh. For example, a rate of 1 C means utilization of all of the stored energy in one hour; a 0.1 C means utilization of 10% of the energy in one hour and the full energy in 10 hours; and a 5 C means utilization of the full energy in 12 minutes.

The term "ampere-hour (Ah)" refers to a unit used in specifying the storage capacity of a battery. For example, a battery with 1 Ah capacity can supply a current of one ampere for one hour or 0.5 A for two hours, etc. Therefore, 1 Ampere-hour (Ah) is the equivalent of 3600 coulombs of electrical charge. Similarly, the term "miniampere-hour (mAh)" also refers to a unit of the storage capacity of a battery and is $\frac{1}{1,000}$ of an ampere-hour.

The term "doctor blading" refers to a process for fabrication of large area films on rigid or flexible substrates. A coating thickness can be controlled by an adjustable gap width between a coating blade and coating surface, which allows the deposition of variable wet layer thicknesses.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$, and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed.

In certain embodiments, the aqueous solution is prepared by dissolving the salt of nickel, the salt of manganese and the salt of cobalt in de-ionized water at any temperature that is suitable for dissolution, wherein a molar ratio of the metal elements Ni to Mn to Co is 1.2-7.2 to 1.5-3.1 to 1-2.2. The range "1.2-7.2" refers to from about 1.2 to about 7.2. The range "1.5-3.1" refers to from about 1.5 to about 3.1. The range "1-2.2" refers to from about 1 to about 2.2. In some embodiments, a mixture of water and one or more water-miscible solvents such as polyethylene glycol or alcohols may also be used.

Any temperature that can dissolve the salt of nickel, the salt of manganese, and the salt of cobalt in de-ionized water can be used herein. In some embodiments, the salt of nickel, the salt of manganese, and the salt of cobalt can be dissolved by stirring in de-ionized water at room temperature to obtain an aqueous solution. In certain embodiments, the aqueous solution disclosed herein can be prepared by heating at a temperature from about 30° C. to about 80° C., from about 35° C. to about 80° C., from about 40° C. to about 80° C., from about 45° C. to about 80° C., from about 50° C. to about 80° C., from about 55° C. to about 80° C., from about 55° C. to about 70° C., from about 45° C. to about 85° C., or from about 45° C. to about 90° C. In some embodiments, the dissolving temperature is less than 30° C., less than 25° C., less than 22° C., less than 20° C., less than 15° C., or less than 10° C.

The salt of nickel, the salt of manganese, and the salt of cobalt disclosed herein can include an anion selected from the group consisting of chloride, iodide, bromide, nitrate, sulfate, sulfite, phosphate, chlorate, acetate, formate and combinations thereof. Some non-limiting examples of the salt of nickel include nickel acetate, nickel carbonate, nickel nitrate, nickel sulfate and nickel chloride. Some non-limiting examples of the salt of manganese include manganese chloride, manganese sulfate, manganese nitrate, manganese acetate and manganese formate. Some non-limiting examples of the salt of cobalt include cobalt acetate, cobalt carbonate, cobalt nitrate, cobalt sulfate and cobalt chloride.

The concentration of the salt of nickel, the salt of manganese, and the salt of cobalt in the aqueous solution can be any concentration as long as it does not exceed the critical saturated concentration. In certain embodiments, a total molar concentration of metal elements in the aqueous solution is from about 0.9 mol/L to about 1.6 mol/L, from about 1.0 mol/L to about 1.6 mol/L, from about 1.1 mol/L to about 1.6 mol/L, from about 1.2 mol/L to about 2.0 mol/L, from about 1.3 mol/L to about 2.0 mol/L, from about 1.1 mol/L to about 2.5 mol/L, or from about 1.2 mol/L to about 2.5 mol/L.

Figure 2:
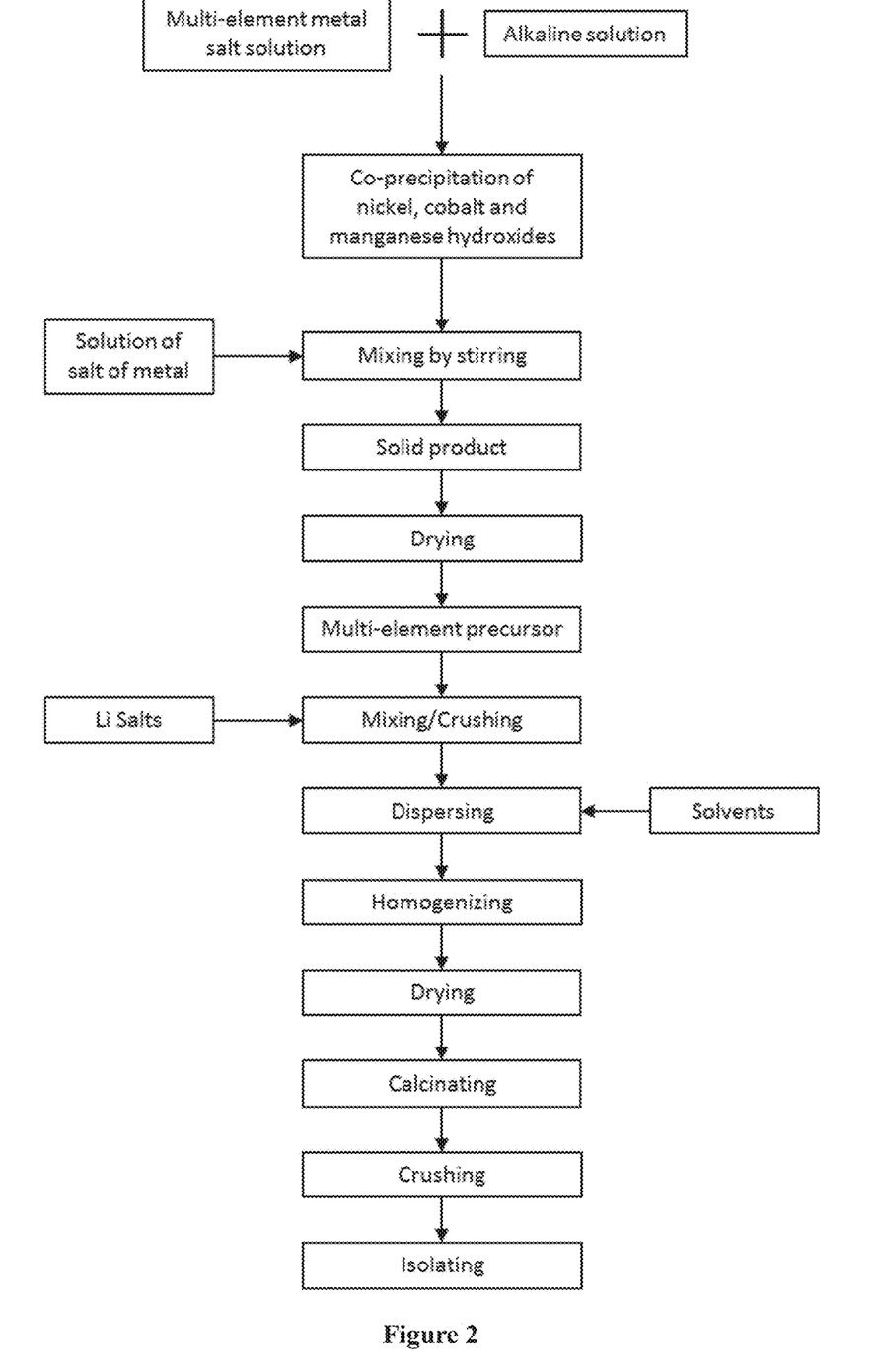
FIG. 2 depicts an embodiment of the method disclosed herein.

The aqueous solution can be added into a stirring alkaline solution to form a suspension of multi-element metal hydroxide particles at room temperature (see FIG. 2). In some embodiments, the aqueous solution can be added into a stirring alkaline solution at any elevated temperature. In certain embodiments, the aqueous solution can be added into a stirring alkaline solution at any temperature below room temperature.

In some embodiments, the aqueous solution is added into an alkaline solution by a pump. Any pump that can transfer the aqueous solution to the alkaline solution can be used herein. Some non-limiting examples of the pump include tubular diaphragm pumps, bellows pumps, peristaltic pump and diaphragm pumps.

In certain embodiments, the aqueous solution is added into the alkaline solution by a pump at a flow rate from about 1 mL/second to about 3 mL/second, from about 2 mL/second to about 4 mL/second, from about 1 mL/second to about 2 mL/second, or from about 2 mL/second to about 3 mL/second. In certain embodiments, the flow rate is about 0.5 mL/second, about 1 mL/second, about 1.5 mL/second, about 2 mL/second, about 2.5 mL/second or about 3 mL/second. In further embodiments, the flow rate is constant.

In some embodiments, the alkaline solution comprises a base selected from the group consisting of alkali metal hydroxides, alkali metal carbonates, alkaline earth metal hydroxides, alkaline earth metal carbonates, alkaline earth metal hydrogen carbonates, organic base and combinations thereof. In further embodiments, the base is selected from the group consisting of LiOH, NaOH, KOH, $NH_3.H_2O$, $Be(OH)_2$, $Mg(OH)_2$, $Ca(OH)_2$, $Li_2CO_3$, $Na_2CO_3$, $NaHCO_3$, $K_2CO_3$, $KHCO_3$, $(CH_3)_4NOH$ and combinations thereof. In still further embodiments, the base is selected from the group consisting of LiOH, NaOH, KOH, $NH_3-H_2O$ and combinations thereof.

The pH value in step 2) is maintained during the addition of the aqueous solution at a range from about 10 to about 12 by addition of the alkaline solution disclosed herein. In some embodiments, the pH of the solution is from 10 to 11.5. In certain embodiments, the pH is from 10 to 11. In certain embodiments, the pH is from 11 to 12. In some embodiments, more than one pH sensors can be used for monitoring the pH value.

In certain embodiments, after adding the aqueous solution, the solution can be further stirred for a time period sufficient for forming the suspension of the multi-element metal hydroxide particles. In certain embodiments, the time period is from about 15 minutes to about 2 hours, from about 30 minutes to about 2 hours, from about 1 hour to about 2 hours, from about 1 hour to about 3 hours, from about 1 hour to about 4 hours, or from about 1 hour to about 5 hours.

After the formation of the suspension of the multi-element metal hydroxide particles, a solution of a salt of a metal is added into the suspension to form a solid product comprising a precipitate of a hydroxide of the metal on the surface of the multi-element metal hydroxide particles (see FIG. 2).

In some embodiments, the salt of the metal comprises at least one metal element selected from the group consisting of Fe, Mn, Al, Mg, Zn, Ti, La, Ce, Sn, Zr, Ru, alkaline earth metal elements, transition metal elements and combinations thereof. In further embodiments, the transition metal elements are selected from transition metals of Group 4, Group 5, Group 6, Group 7, Group 8, Group 9, Group 10 or Group 11 in the Periodic Table. In certain embodiments, the metal element is at least one element selected from the group consisting of Fe, Mn, Al, Mg, Zn, Ti, La, Ce, Sn, Zr, Ru and combinations thereof. In some embodiments, the metal element is at least one element selected from the group consisting of Fe, Al, Mg, Ce, La and combinations thereof.

In certain embodiments, the salt of the metal comprises an anion selected from the group consisting of chloride, iodide, bromide, nitrate, sulfate, sulfite, phosphate, chlorate, acetate, formate and combinations thereof.

In some embodiments, the solvent used for preparing the solution of the salt of the metal is water. In other embodiments, the solvent is a mixture of water and one or more water-miscible solvents, such as polyethylene glycol and alcohols.

Any temperature that can dissolve the salt of the metal in de-ionized water can be used herein. In some embodiments, the salt of the metal can be dissolved by stirring in de-ionized water at room temperature to obtain the solution of the salt of the metal. In some embodiments, the solution of the salt of the metal can be prepared by heating at a temperature from about 30° C. to about 80° C., from about 35° C. to about 80° C., from about 40° C. to about 80° C., from about 45° C. to about 80° C., from about 50° C. to about 80° C., from about 55° C. to about 80° C., from about 55° C. to about 70° C., from about 45° C. to about 85° C., or from about 45° C. to about 90° C. In certain embodiments, the dissolving temperature is less than 30° C., less than 25° C., less than 22° C., less than 20° C., less than 15° C., or less than 10° C.

In some embodiments, a molar concentration in the solution of the salt of the metal is from about 0.05 mol/L to about 0.5 mol/L, from about 0.1 mol/L to about 0.5 mol/L, from about 0.2 mol/L to about 0.5 mol/L, from about 0.3 mol/L to about 0.6 mol/L, from about 0.3 mol/L to about 0.7 mol/L, or from about 0.4 mol/L to about 0.7 mol/L.

In certain embodiments, the solution of the salt of the metal is added into the suspension by a pump. Any pump that can transfer the solution of the salt of the metal to the suspension can be used herein. Some non-limiting examples of the pumps include tubular diaphragm pumps, bellows pumps, peristaltic pump and diaphragm pumps.

In some embodiments, the solution of the salt of the metal is added into the suspension by a pump at a flow rate from about 1 mL/second to about 5 mL/second, from about 2 mL/second to about 5 mL/second, from about 3 mL/second to about 5 mL/second, or from about 0.5 mL/second to about 5 mL/second. In certain embodiments, the flow rate is about 1 mL/second, about 2 mL/second, about 3 mL/second, about 4 mL/second, or about 5 mL/second. In certain embodiments, flow rate is constant.

The formation of the solid product comprising a precipitate of a hydroxide of the metal on the surface of the multi-element metal hydroxide particles can be carried out for a time period that is sufficient for forming the solid product (see FIG. 2). In some embodiments, the time period is from about 15 minutes to about 2 hours, from about 30 minutes to about 2 hours, from about 1 hour to about 2 hours, from about 1 hour to about 3 hours, from about 1 hour to about 4 hours, from about 1 hour to about 5 hours, or from about 1 hour to about 1.5 hours.

The method disclosed herein allows the formation of the multi-element metal hydroxide particles and hydroxide of the metal on the surface of the multi-element metal hydroxide particles in the same pot. The one-pot reaction simplifies the overall processes, and saves time and cost.

In some embodiments, the solid product can be separated from the suspension, followed by drying. The drying process is performed by a dryer to obtain a multi-element precursor (see FIG. 2). Any dryer that can dry the solid product can be used herein. Some non-limiting examples of suitable dryer include a microwave dryer or a microwave vacuum dryer.

In certain embodiments, the microwave dryer or microwave vacuum dryer is operated at a power from about 5 kW to about 15 kW, from about 6 kW to about 20 kW, from about 7 kW to about 20 kW, from about 15 kW to about 70 kW, from about 20 kW to about 90 kW, from about 30 kW to about 100 kW, or from about 50 kW to about 100 kW.

In some embodiments, the drying step can be carried out for a time period that is sufficient for drying the solid product. In some embodiments, the drying time is from about 3 minutes to about 2 hours, from about 5 minutes to about 2 hours, from about 10 minutes to about 3 hours, from about 10 minutes to about 4 hours, from about 15 minutes to about 4 hours, or from about 20 minutes to about 5 hours.

In certain embodiments, the solid product can be dried without separation. Any dryer that can dry the wet solid product can be used herein. In some embodiments, the drying process is performed by a spray dryer to obtain a multi-element precursor. Spray drying can be carried out using standard equipment as used for spray drying. The drying run can be varied depending upon the equipment and facilities used for the fill/finish.

An exemplary procedure for use in spray drying the pre-drying solutions or dispersions is set forth below. However, a person skilled in the art would understand that modifications to the procedure or process can be made depending on such things as, but not limited to, the pre-drying solution or dispersion and spray drying equipment.

Initially, the air flow of the spray drier is set to the desired operating rate. This rate depends on the desired quantity to be spray dried. The desired pressure drop across the spray drying system and the geometry and size of the spray drying apparatus can be calculated by heat and energy balances as known in the art. The air will be heated by means of a heat exchanger. The heat duty of the heat exchanger is adjusted appropriately so as to obtain a targeted temperature at the outlet of the spray chamber. In some embodiments, this temperature is from about 50° C. to about 120° C., from about 60° C. to about 120° C., from about 60° C. to about 100° C., from about 60° C. to about 90° C., from about 70° C. to about 120° C., from about 70° C. to about 100° C., from about 70° C. to about 80° C., from about 80° C. to about 120° C., from about 90° C. to about 120° C., from about 90° C. to about 110° C., from about 100° C. to about 110° C., or from about 110° C. to about 130° C. In certain embodiments, inert gas of high enthalpy, such as nitrogen, can be used. In certain embodiments, air or inert gas of high enthalpy is at about 0.5 to about 0.99 atmosphere pressure. In certain embodiments, air or inert gas of high enthalpy is less than about 0.99 atmosphere pressure. In certain embodiments, air or inert gas of high enthalpy is about 0.5 to about 1.5 atmosphere pressure.

Next, the atomizing air-flow rate in the spray nozzle of the spray dryer is set to a desired operating value. This flow rate depends on the kind and geometry of the nozzle and the desired properties of the resulting dry-powder particles.

The feeding rate of the aqueous pre-drying solution is then ramped up to the desired flow rate. The feeding rate is adjusted appropriately so as to obtain a targeted temperature at the outlet of the spray chamber. In some embodiments, this temperature is from about 50° C. to about 120° C., from about 60° C. to about 120° C., from about 60° C. to about 100° C., from about 60° C. to about 90° C., from about 70° C. to about 120° C., from about 70° C. to about 100° C., from about 70° C. to about 80° C., from about 80° C. to about 120° C., from about 90° C. to about 120° C., from about 90° C. to about 110° C., from about 100° C. to about 110° C., or from about 110° C. to about 130° C.

In some embodiments, the drying step can be carried out for a time period that is sufficient for drying the solid product. In some embodiments, the drying time is from about 15 minutes to about 5 hours, from about 30 minutes to about 5 hours, from about 1 hour to about 5 hours, from about 3 hours to about 5 hours, from about 4 hours to about 5 hours, or from about 4 hours to about 6 hours.

The multi-element precursor can be mixed with one or more lithium salts to obtain a first mixture (see FIG. 2). Some non-limiting examples of the lithium salts include LiF, LiCl, LiBr, LiI, LiOH, $Li_2CO_3$, $LiHCO_3$, $Li_2NO_3$, $Li_2SO_4$, $LiHSO_4$, $Li_3PO_4$, $Li_2HPO_4$, and $LiH_2PO_4$. In some embodiments, the lithium salt is LiOH, $Li_2CO_3$, LiF or a combination thereof.

In some embodiments, the molar ratio of the metal element Li to a total amount of the metal elements Ni, Mn, Co and the metal is 1.02-1.2 to 1. The range "1.02-1.2" refers to from about 1.02 to about 1.2.

Any equipment that can mix the multi-element precursor with one or more lithium salts to obtain a first mixture can be used herein. In some embodiments, the equipment for mixing is a mill. Some non-limiting examples of the mill include ball mill, bead mill, attritor mill, sand mill, horizontal mill, vertical mill, and vibratory mill. In certain embodiments, a media such as balls, pebbles, small rock, sand or other media is used in a stirred mixture along with the sample material to be mixed. In some embodiments, the ball is made of steel, stainless steel, ceramic or rubber.

The mixing process using a mill can achieve the effect of crushing, grinding and blending materials because the collisions of the media with the sample material break the particles into smaller pieces. By controlling the time, applied energy, and the size of the grinding media, almost any size particle can be obtained.

In some embodiments, media mills may be operated dry without any added liquid. In certain embodiments, media mills may be operated in a solvent or water with additional dispersants.

After the mixing step, the first mixture can be dispersed in an aqueous solvent to form a slurry (see FIG. 2). In some embodiments, the aqueous solvent is a solution containing water and an alcohol or any solvent that is miscible with water. Some non-limiting examples of the alcohol include $C_2$-$C_4$ alcohols, methanol, ethanol, isopropanol, n-propanol and butanol, and combinations thereof.

In certain embodiments, the aqueous solvent is a solution containing water as the major component and a volatile solvent, such as alcohols, lower aliphatic ketones, lower alkyl acetates or the like, as the minor component in addition to water. In certain embodiments, the amount of water is at least 50%, at least 55%, at least 60%, at least 65%, at least 70%, at least 75%, at least 80%, at least 85%, at least 90%, or at least 95% to the total amount of water and solvents other than water. In some embodiments, the amount of water is at most 55%, at most 60%, at most 65%, at most 70%, at most 75%, at most 80%, at most 85%, at most 90%, or at most 95% to the total amount of water and solvents other than water. In some embodiments, the aqueous solvent consists solely of water, that is, the proportion of water in the aqueous solvent is 100 vol. %.

Any water-miscible solvents can be used as the minor component. Some non-limiting examples of the minor component (i.e., solvents other than water) include alcohols, lower aliphatic ketones, lower alkyl acetates and combinations thereof. Some non-limiting examples of the alcohol include $C_2$-$C_4$ alcohols, such as methanol, ethanol, isopropanol, n-propanol, butanol, and combinations thereof. Some non-limiting examples of the lower aliphatic ketones include acetone, dimethyl ketone, and methyl ethyl ketone. Some non-limiting examples of the lower alkyl acetates include ethyl acetate, isopropyl acetate, and propyl acetate.

In certain embodiments, the volatile solvent or the minor component is methyl ethyl ketone, ethanol, ethyl acetate or a combination thereof.

In some embodiments, the aqueous solvent is a mixture of water and one or more water-miscible minor components. In certain embodiments, the aqueous solvent is a mixture of water and a minor component selected from ethanol, isopropanol, n-propanol, t-butanol, n-butanol, and combinations thereof. In some embodiments, the volume ratio of water and the minor component is from about 51:49 to about 100:1.

In certain embodiments, the aqueous solvent is water. Some non-limiting examples of water include tap water, bottled water, purified water, pure water, distilled water, de-ionized water, $D_2O$, or a combination thereof. In some embodiments, the aqueous solvent is de-ionized water. In certain embodiments, the aqueous solvent is free of alcohol, aliphatic ketone, alkyl acetate, or a combination thereof.

The slurry can be homogenized by a homogenizer (see FIG. 2). Any equipment that can homogenize the slurry can be used herein. In some embodiments, the homogenizer is a blender, a mill, an ultrasonicator, a rotor-stator homogenizer, or a high pressure homogenizer.

In some embodiments, the homogenizer is an ultrasonicator. Any ultrasonicator that can apply ultrasound energy to agitate and disperse particles in a sample can be used herein. In some embodiments, the ultrasonicator is a probe-type ultrasonicator or an ultrasonic flow cell.

In certain embodiments, the ultrasonic flow cell can be operated in a one-pass mode, multiple-pass or recirculating mode. In some embodiments, the ultrasonic flow cell can include a water-cooling jacket to help maintain the required temperature. Alternatively, a separate heat exchanger may be used. In certain embodiments, the flow cell can be made from stainless steel or glass.

In some embodiments, the slurry is homogenized for a time period from about 1 hour to about 10 hours, from about 2 hours to about 4 hours, from about 15 minutes to about 4 hours, from about 30 minutes to about 4 hours, from about 1 hour to about 4 hours, from about 2 hours to about 5 hours, from about 3 hours to about 5 hours, or from about 2 hours to about 6 hours.

In certain embodiments, the ultrasonicator is operated at a power density from about 10 W/L to about 100 W/L, from about 40 W/L to about 60 W/L, from about 20 W/L to about 100 W/L, from about 30 W/L to about 100 W/L, from about 40 W/L to about 80 W/L, from about 40 W/L to about 70 W/L, from about 40 W/L to about 50 W/L, or from about 50 W/L to about 60 W/L.

The continuous flow through system has several advantages over the batch-type processing. By sonication via ultrasonic flow cell, the processing capacity becomes significantly higher. The retention time of the material in the flow cell can be adjusted by adjusting the flow rate.

By sonication via recirculating mode, the material is recirculated many times through the flow cell in a recirculating configuration. Recirculation increases the cumulative exposure time because liquid passes through the ultrasonic flow cell once in a single-pass configuration.

The multiple-pass mode has a multiple flow cell configuration. This arrangement allows for a single-pass processing without the need for recirculation or multiple passes through the system. This arrangement provides an additional productivity scale-up factor equal to the number of utilized flow cells.

The homogenizing process disclosed herein reduces or eliminates the potential aggregation of the multi-element precursor and the one or more lithium salts and enhances dispersion of each ingredient in the slurry.

The slurry can be dried by a dryer to obtain a solid mixture (see FIG. 2). Any dryer that can dry the slurry can be used herein. In some embodiments, the drying process is performed by a double-cone vacuum dryer, a microwave dryer, or a microwave vacuum dryer.

In some embodiments, the dryer is a microwave dryer or a microwave vacuum dryer. In some embodiments, the microwave dryer or microwave vacuum dryer is operated at a power from about 5 kW to about 15 kW, from about 6 kW to about 20 kW, from about 7 kW to about 20 kW, from about 15 kW to about 70 kW, from about 20 kW to about 90 kW, from about 30 kW to about 100 kW, or from about 50 kW to about 100 kW.

In certain embodiments, the drying step can be carried out for a time period that is sufficient for drying the slurry. In some embodiments, the drying time is from about 3 minutes to about 2 hours, from about 5 minutes to about 2 hours, from about 10 minutes to about 3 hours, from about 10 minutes to about 4 hours, from about 15 minutes to about 4 hours, or from about 20 minutes to about 5 hours.

In some embodiments, the solid mixture can be calcinated under an atmosphere with an oxygen content higher than 21% to obtain a calcinated product (see FIG. 2). In certain embodiments, the oxygen content in the calcinating process is at least 22%, at least 25%, at least 30%, at least 32%, at least 34%, at least 36%, at least 40%, at least 45%, at least 50%, at least 55%, at least 60%, at least 65%, at least 70%, at least 75%, at least 80%, at least 85%, at least 90%, at least 95%, or at least 99%. In some embodiments, the oxygen content in the calcinating process is at most 25%, at most 30%, at most 35%, at most 40%, at most 45%, at most 50%, at most 55%, at most 60%, at most 65%, at most 70%, at most 75%, at most 80%, at most 85%, at most 90%, at most 95%, or at most 99. In certain embodiments, the oxygen content in the calcinating process is 100%. In general, the reaction time for complete transformation of the hydroxide of the metal into corresponding metal oxide decreases with increasing oxygen content.

Any furnace or oven that can calcinate the solid mixture can be used herein. In some embodiments, the calcination process is performed by a furnace. Some non-limiting examples of the furnace include a box furnace, a push-plate tunnel furnace and a rotary furnace. In some embodiments, the furnace can operate at atmospheric pressure. In some embodiments, the furnace can operate in an inert atmosphere.

In some embodiments, the furnace comprises an agitation device which is used for agitating the powdered solids. In certain embodiments, the agitation device comprises a rotating blade or paddle.

Heat transfer in the rotary furnace and furnace equipped with a stirring apparatus is usually much more efficient than static furnace because they offer the advantage of providing agitation to powdered solids. Mechanism of agitation ensures uniform heating of the powdered solids. This overcomes the problem of long reaction times often experienced by processing in a box furnace and hence lowers the operating costs.

In some embodiments, the solid mixture can be dried at temperature from about 600° C. to about 900° C., from about 650° C. to about 900° C., from about 700° C. to about 900° C., from about 650° C. to about 850° C., from about 700° C. to about 850° C., or from about 750° C. to about 850° C.

In certain embodiments, the temperature of the calcination process is increased gradiently with a ramping rate from about 1° C./minute to about 5° C./minute, from about 2° C./minute to about 5° C./minute, from about 3° C./minute to about 5° C./minute, from about 2° C./minute to about 6° C./minute, from about 3° C./minute to about 6° C./minute, or from about 1° C./minute to about 4° C./minute.

In some embodiments, the drying time of the calcination process is from about 4 hours to about 12 hours, from about 5 hour to about 12 hours, from about 6 hours to about 12 hours, from about 7 hours to about 12 hours, from about 6 hours to about 12 hours, from about 8 hours to about 12 hours, from about 6 hours to about 11 hours, or from about 7 hours to about 11 hours.

In certain embodiments, the solid mixture has an average particle size D50 in the range from about 1 μm to about 10 μm, from about 2 μm to about 10 μm, from about 3 μm to about 10 μm, from about 1 μm to about 9 μm, from about 1 μm to about 8 μm, from about 1 μm to about 7 μm, from about 2 μm to about 11 μm, or from about 3 μm to about 11 μm.

After the calcinating step, the calcinated product can be cooled to room temperature, followed by crushing the calcinated product and isolating particles of the calcinated product to obtain the cathode material (see FIG. 2).

In some embodiments, the calcinated product is cooled by decreasing the temperature gradiently with a ramping rate. In certain embodiments, the temperature of the calcination process is decreased gradiently with a ramping rate from about 1° C./minute to about 5° C./minute, from about 2° C./minute to about 5° C./minute, from about 3° C./minute to about 5° C./minute, from about 2° C./minute to about 6° C./minute, from about 3° C./minute to about 6° C./minute, or from about 1° C./minute to about 4° C./minute.

Crushing or grinding is obtained through the impact of the particles of the calcinated product on solid surfaces, through particle-particle collisions, or through rapid pressure changes resulting in cavitations. Any crusher that can crush the calcinated product can be used herein. In some embodiments, the crushing process is performed by a milling equipment. Some non-limiting examples of the milling equipment include a hammer mill, a jet mill and a high pressure dispersion mill.

In any crushing or grinding process, the particle size distribution that results is Gaussian and, in most cases, is broader than desired. In those cases, the ground material is post-processed to separate it into the desired particle sizes.

In some embodiments, the crushed particles of the calcinated product can be separated by using a screen or a sieve. The material is placed on the screen and then the screen is shaken to allow the smaller particles to flow through. The "overs" are the particles that remain on the screen and the "unders" are the particles that pass through the screen.

Particles that are smaller than 100 microns are usually difficult to screen at high rates. In these cases, the particles are separated using air classifiers. This equipment operates by applying opposing air flows and centrifugal forces. By balancing the two forces, particles with different sizes can be separated from each other. Good separation is usually obtainable down to two microns. Depending on the size of the screen or the classifier rates, classification can be as low as one pound per hour to as high as thousands of pounds per hour.

In some embodiments, the isolating step is performed by passing through a mesh sieve having a range from about 200 to about 400. In further embodiments, the isolating step can be performed twice with two sieves of different mesh sizes. The crushed particles of the calcinated product pass through a mesh sieve of the desired mesh size. The isolated particles of the calcinated product from the first isolating step can then pass through a second mesh sieve of a smaller mesh to reduce the size of the particles even further. In still further embodiments, the isolated particles of the calcinated product from the second isolating step can pass through mesh sieves with mesh sizes that continue to become smaller.

In some embodiments, the crushed particles of the calcinated product can be separated by using an air classifier. In certain embodiments, the isolating step can be performed twice with a mesh sieve and an air classifier. The crushed particles of the calcinated product pass through a mesh sieve of the desired mesh size. The isolated particles of the calcinated product from the first isolating step can then pass through an air classifier to reduce the size of the particles even further.

In certain embodiments, the separated fine particles can be further gas classified in a second classification, with particles having larger sizes being separated and thereafter gathered to form a group of particles suitable for subsequent screening into various commercially usable sizes or for recycling back to the air classifier for further classification.

Figure 1:
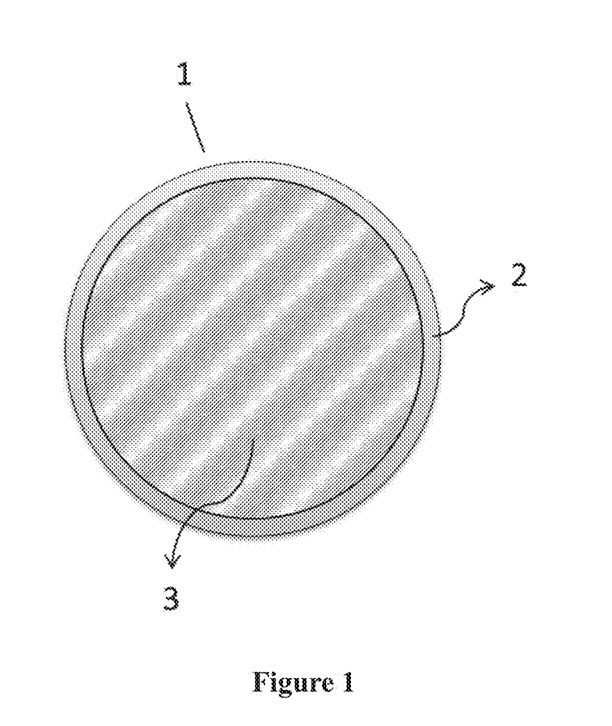
FIG. 1 depicts a schematic structure of a surface modified multi-element metal oxide cathode particle.

FIG. 1 depicts a schematic structure of surface modified multi-element metal oxide cathode particle (1) synthesized by the method disclosed herein. The surface modified multi-element metal oxide cathode particle (1) comprises a thin film of an oxide of the metal (2) and a lithium multi-metal composite oxide particle (3).

In some embodiments, the isolated particles of the calcinated product have an average particle size D50 in the range from about 5 μm to about 15 μm, from about 6 μm to about 15 μm, from about 7 μm to about 15 μm, from about 5 μm to about 14 μm, from about 5 μm to about 13 μm, from about 5 μm to about 12 μm, from about 4 μm to about 14 μm, from about 4 μm to about 15 μm, or from about 5 μm to about 16 μm.

In certain embodiments, the thin film of the oxide of the metal capped on the surface of the lithium multi-metal composite oxide particle is selected from a group consisting of $Fe_2O_3$, $MnO_2$, $Al_2O_3$, MgO, ZnO, $TiO_2$, $La_2O_3$, $CeO_2$, $SnO_2$, $ZrO_2$, $RuO_2$ and combinations thereof.

In some embodiments, the thin film of the oxide of the metal capped on the surface of the lithium multi-metal composite oxide particle has a thickness from about 500 nm to about 1 μm. In certain embodiments, the thickness of the thin film of the oxide of the metal is from about 250 nm to about 1 μm, from about 600 nm to about 1.2 μm, from about 750 nm to about 1.5 μm, from about 850 nm to about 2 μm, or from about 1 μm to about 2 μm.

The thin film of the oxide of the metal allows lithium ions in the electrolyte to pass through it without affecting the lithium-ion conductivity through the surface. Meanwhile, the thin film of the oxide of the metals acts as a protective layer on the cathode surface, which prevents the inside cathode material from reacting with the electrolyte.

The cathode material prepared by the method disclosed herein exhibits exceptional durable cycling capability at high rate of charge and discharge, and safety characteristics without sacrificing its specific capacity typically in the range from about 150 mAh/g to about 200 mAh/g.

The following examples are presented to exemplify embodiments of the invention but are not intended to limit the invention to the specific embodiments set forth. Unless indicated to the contrary, all parts and percentages are by weight. All numerical values are approximate. When numerical ranges are given, it should be understood that embodiments outside the stated ranges may still fall within the scope of the invention. Specific details described in each example should not be construed as necessary features of the invention.

EXAMPLES

The average particle size D50 was obtained from a frequency distribution and accumulative volume distribution curve measured by means of a laser scattering particle size distribution measuring apparatus. The measurement of particle sizes was carried out by measuring the particle size distribution while the powder is sufficiently dispersed in an aqueous medium by using MicroBrook 2000LD Particle Size Analyzer (obtained from Brookhaven Instruments Cooperation, US).

BET (Brunauer-Emmett-Teller) analysis is a technique to evaluate the specific surface area of a given powder material by physical adsorption of a gas (e.g. nitrogen, argon, and helium) on the surface of the solid and by calculating the amount of adsorbate gas corresponding to a monomolecular layer on the surface. The amount of gas adsorbed can be measured by a volumetric or continuous flow procedure. The technique encompasses external area and pore area evaluations to determine the total specific surface area in a unit of $m^2/g$. The measurement was performed by using SA 3100 Surface Area and Pore Size Analyzer (obtained from Beckman Coulter, Inc., US).

The nail penetration test is an important method to access the safety of Li-ion cells presumably to simulate internal shorts, which is widely used across the battery industry and battery-user community. It involves driving a metallic nail through a charged Li-ion cell at a prescribed speed. The cell is deemed to have passed if there is no smoke or flame following the puncturing, by visual confirmation. The test was conducted by passing a stainless steel nail with 3 mm diameter and 80° taper angle through the test cell in a state of charge of 95% with a speed of 1 cm/second.

The chemicals were purchased and used as received.

Example 1

Preparation of Multi-Element Metal Hydroxide Particles

An aqueous solution was prepared by dissolving 55 g of nickel sulfate, 51.8 g of manganese sulfate and 51.3 g of cobalt sulfate in 1 L de-ionized water. Three metal sulfates were obtained from Aladdin Industries Corporation, China. An alkaline solution was prepared by dissolving 10 g of NaOH and 210 g of $NH_4OH$ in 5 L de-ionized water. The pH value of the alkaline solution was then adjusted to about 11.9 by an addition of NaOH and $NH_4OH$. To a glass reaction tank containing the stirring alkaline solution was added the aqueous solution by a diaphragm pump (obtained from Cole-Parmer, US) at a rate of 1 mL/second to obtain a suspension of multi-element metal (Ni—Mn—Co) hydroxide particles. The pH value was monitored and maintained at above 10 by an addition of $NH_4OH$, Preparation of a Multi-Element Precursor A solution of salts of metals was prepared by dissolving 40 g of iron sulfate ($Fe_2(SO_4)_3$), 10.2 g of aluminum sulfate ($Al_2(SO_4)_3$) and 2.8 g of lanthanum sulfate ($La_2(SO_4)_3$) in 1 L de-ionized water. Three metal sulfates were obtained from Aladdin Industries Corporation, China. To the suspension of multi-element metal hydroxide particles was slowly added the solution of the salts of the metals. A solid product comprising a precipitate of a mixture of iron hydroxide, aluminum hydroxide and lanthanum hydroxide on the surface of the Ni—Mn—Co hydroxide particles was then obtained. The solid product was filtered from the suspension and then dried by a microwave dryer (model no. ZY-4HO, obtained from Zhiya Industrial Microwave Equipment Co., Ltd., Guangdong, China) at 2.45 GHz to obtain 92 g of a multi-element precursor.

Preparation of a Cathode Material

The multi-element precursor was mixed with 31.8 g of LiOH powder (obtained from Aladdin Industries Corporation, China) by ball milling for 1 hour to obtain a first mixture. The first mixture was dispersed in 500 mL of deionized water to form a slurry. An ultrasonic probe (NP2500 from Guangzhou Newpower Ultrasonic Electronic Equipment Co., Ltd., China) with an input power of 200 W was used to homogenize the slurry for about 2.5 hours. The slurry was then dried by a microwave dryer of 2.45 GHz for about 15 minutes to obtain a solid mixture. The solid mixture was calcinated in a rotary furnace (model no. KY-R-SJQ130, obtained from Xianyang Institute of Ceramics Industry, Thermal Equipment Center, Shanxi, China) rotating with a speed of about 0.5 round per second in a flowing atmosphere containing about 32-34% oxygen at 800° C. for about 8 hours to obtain a calcinated product, where the temperature of the rotary furnace was increased from room temperature to 800° C. at a heating rate of 3° C./minute. The calcinated product was then cooled to room temperature at a rate from 3° C./minute to 5° C./minute. After cooling, the calcinated product was crushed by a jet mill (model no. LNJ-6A, obtained from Mianyang Liuneng Powder Equipment Co., Ltd., Sichuan, China) for about 1 hour, followed by passing through a 400 mesh sieve to obtain a metal (Fe,Al,La) oxide modified $Li_{1.02}Ni_{0.35}Mn_{0.34}Co_{0.31}O_2$ cathode material having an average particle size D50 of 13.5 μm, D10 of 7.8 μm, D90 of 20.6 μm and a specific surface area of 0.58 $m^2/g$ obtained by the BET method.

Electrochemical Measurements

The electrochemical performance of the cathode material prepared by the method described in Example 1 was tested in CR2032 coin-type Li cells assembled in an argon-filled glove box. To fabricate the working electrode, a slurry was prepared by thoroughly mixing a solution of polyvinylidene fluoride (PVDF) dissolved in N-methyl-2-pyrrolidone (NMP) with the carbon black and cathode material. The slurry consisting of 94 wt. % cathode material prepared by the method described in Example 1, 3 wt. % carbon black, and 3 wt. % polyvinylidene fluoride was casted onto an aluminum foil as a current collector and dried at 80° C. under vacuum for 5 hours. After drying, the coated aluminum foil was cut into disc-form electrode for coin cell assembly. A metal lithium foil having a thickness of 500 μm served as a negative electrode. The electrolyte was a solution of $LiPF_6$ (1 M) in a mixture of ethylene carbonate (EC), ethyl methyl carbonate (EMC) and dimethyl carbonate (DMC) in a volume ratio of 1:1:1.

Figure 3A:
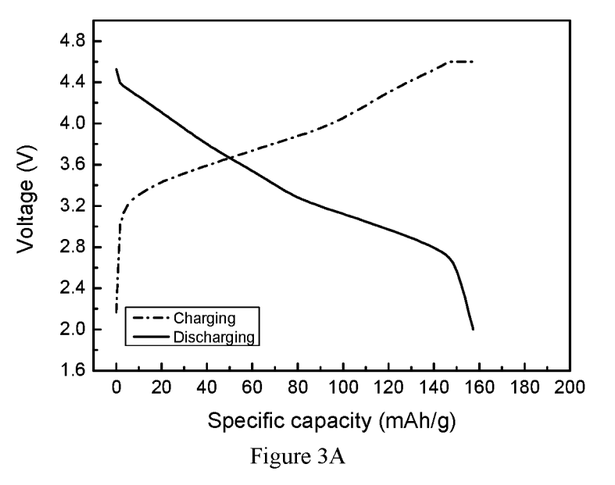
FIGS. 3A, 3B, 3C and 3D depict changes in voltage and specific gravity during charging and discharging of Examples 1, 2, 3 and 4 respectively.

The coin cells were analyzed in a constant current mode using a multi-channel battery tester (BTS-4008-5V10 mA, obtained from Neware Electronics Co. Ltd, China). After 1 cycle at C/20 was completed, they were charged and discharged at a rate of C/2. The charging/discharging cycling tests of the cells were performed between 2.0 and 4.6 V at a current density of C/2 at 25° C. The discharge capacity was 156 mAh/g. The result of the charge/discharge test is shown in FIG. 3A.

Example 2

Preparation of Multi-Element Metal Hydroxide Particles

An aqueous solution was prepared by dissolving 70 g of nickel sulfate, 46.9 g of manganese sulfate and 24.8 g of cobalt sulfate in 1 L de-ionized water. An alkaline solution was prepared by dissolving 185 g of $NH_4OH$ in 5 L de-ionized water. The pH value of the alkaline solution was then adjusted to about 11 by an addition of $NH_4OH$. To a glass reaction tank containing the stirring alkaline solution was added the aqueous solution by a diaphragm pump at a rate of 2 mL/second to obtain a suspension of multi-element metal (Ni—Mn—Co) hydroxide particles. The pH value was monitored and maintained at above 10 by an addition of $NH_4OH$.

Preparation of a Multi-Element Precursor

A solution of salts of metals was prepared by dissolving 42 g of manganese (IV) sulfate ($Mn(SO_4)_2$), 6.4 g of magnesium sulfate ($MgSO_4$) and 9 g of cesium (IV) sulfate ($Ce(SO_4)_2$) in 1 L de-ionized water. Three metal sulfates were obtained from Aladdin Industries Corporation, China. To the suspension of multi-element metal hydroxide particles was slowly added the solution of the salts of the metals. A solid product comprising a precipitate of a mixture of manganese hydroxide, magnesium hydroxide and cesium hydroxide on the surface of the Ni—Mn—Co hydroxide particles was then obtained. The suspension of the solid product was dried by a spray dryer (model no. YC-015, obtained from Pilotech Instrument and Equipment Co., Ltd, China) having an inlet gas temperature of 200-250° C. and outlet temperature of 110-120° C. to obtain 82.3 g of a multi-element precursor.

Preparation of a Cathode Material

The multi-element precursor was mixed with 95 g of $Li_2CO_3$ powder (obtained from Aladdin Industries Corporation, China) by ball milling for 1.5 hour to obtain a first mixture. The first mixture was dispersed in 500 mL of deionized water to form a slurry. An ultrasonic probe with an input power of 300 W was used to homogenize the slurry for about 4 hours. The slurry was then dried by a microwave dryer of 2.45 GHz for about 10 minutes to obtain a solid mixture. The solid mixture was calcinated in a rotary furnace rotating with a speed of about 0.5 round per second in a flowing atmosphere containing about 28-30% oxygen at 850° C. for about 13 hours to obtain a calcinated product, where the temperature of the rotary furnace was increased from room temperature to 850° C. at a heating rate of 2° C./minute. The calcinated product was then cooled to room temperature at a rate from 3° C./minute to 5° C./minute. After cooling, the calcinated product was crushed by a jet mill for about 1.5 hours, followed by passing through a 400 mesh sieve to obtain the metal (Mn,Mg,Ce) oxide modified $Li_{1.1}Ni_{0.51}Mn_{0.34}Co_{0.15}O_2$ cathode material having an average particle size D50 of 14.2 D10 of 8.3 D90 of 21.1 μm and a specific surface area of 0.46 $m^2/g$ obtained by the BET method.

Electrochemical Measurements

The electrochemical performance of the cathode material prepared by the method described in Example 2 was tested in CR2032 coin-type Li cells assembled by the method described in Example 1.

Figure 3B:
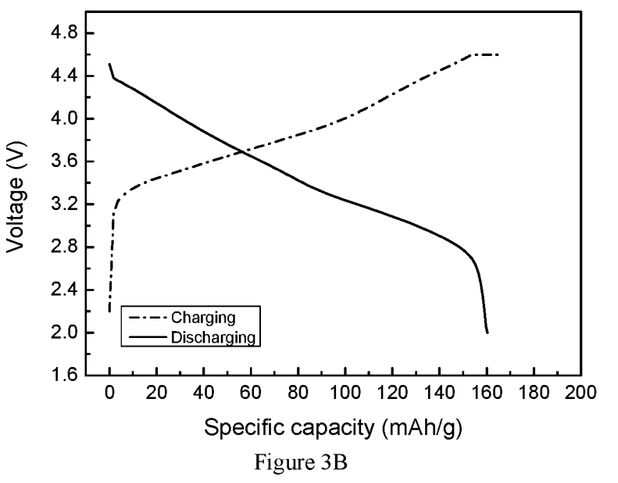

After assembling the CR2032 coin-type Li cells with the cathode material prepared by the method described in Example 2, the coin cells were analyzed in a constant current mode using a multi-channel battery tester. After 1 cycle at C/20 was completed, they were charged and discharged at a rate of C/2. The charging/discharging cycling tests of the cells were performed between 2.0 and 4.6 V at a current density of C/2 at 25° C. The discharge capacity was 164.9 mAh/g. The result of the charge/discharge test is shown in FIG. 3B.

Example 3

Preparation of Multi-Element Metal Hydroxide Particles

An aqueous solution was prepared by dissolving 135 g of nickel sulfate, 39.2 g of manganese sulfate and 18.6 g of cobalt sulfate in 1 L de-ionized water. An alkaline solution was prepared by dissolving 200 g of $NH_4OH$ in 5 L de-ionized water. The pH value of the alkaline solution was then adjusted to about 11.5 by an addition of $NH_4OH$. To a glass reaction tank containing the stirring alkaline solution was added the aqueous solution by a diaphragm pump at a rate of 1.5 mL/second to obtain a suspension of multi-element metal (Ni—Mn—Co) hydroxide particles. The pH value was monitored and maintained at above 10 by an addition of $NH_4OH$.

Preparation of a Multi-Element Precursor

A solution of salts of metals was prepared by dissolving 28 g of zinc sulfate ($ZnSO_4$), 7 g of titanium sulfate ($Ti(SO_4)_2$) and 3.7 g of zirconium sulfate ($Zr(SO_4)_2$) in 1 L de-ionized water. Three metal sulfates were obtained from Aladdin Industries Corporation, China. To the suspension of multi-element metal hydroxide particles was slowly added the solution of the salts of the metals. A solid product comprising a precipitate of a mixture of zinc hydroxide, titanium hydroxide and zirconium hydroxide on the surface of the Ni—Mn—Co hydroxide particles was then obtained. The solid product was filtered from the suspension and then dried by a microwave dryer at 2.45 GHz to obtain 102.5 g of a multi-element precursor.

Preparation of a Cathode Material

The multi-element precursor was mixed with 40 g of LiOH powder by ball milling for 1.3 hours to obtain a first mixture. The first mixture was dispersed in 500 mL of deionized water to form a slurry. An ultrasonic probe with an input power of 150 W was used to homogenize the slurry for about 5.5 hours. The slurry was then dried by a microwave dryer of 2.45 GHz for about 20 minutes to obtain a solid mixture. The solid mixture was calcinated in a rotary furnace rotating with a speed of about 0.5 round per second in a flowing atmosphere containing about 45-50% oxygen at 650° C. for about 5 hours to obtain a calcinated product, where the temperature of the rotary furnace was increased from room temperature to 650° C. at a heating rate of 1° C./minute. The calcinated product was then cooled to room temperature at a rate from 3° C./minute to 5° C./minute. After cooling, the calcinated product was crushed by a jet mill for about 1.5 hours, followed by passing through a 400 mesh sieve to obtain a metal (Zn,Ti,Zr) oxide modified $Li_{1.15}Ni_{0.78}Mn_{0.15}Co_{0.07}O_2$ cathode material having an average particle size D50 of 12.5 D10 of 7.1 D90 of 19.3 μm and a specific surface area of 0.66 $m^2/g$ obtained by the BET method.

Electrochemical Measurements

The electrochemical performance of the cathode material prepared by the method described in Example 3 was tested in CR2032 coin-type Li cells assembled by the method described in Example 1.

Figure 3C:
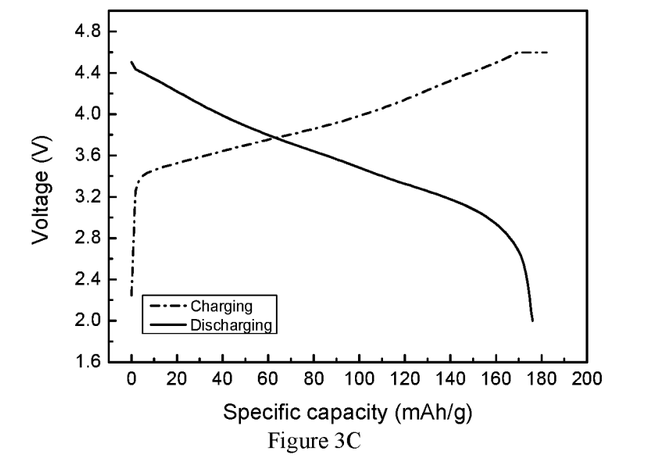

After assembling the CR2032 coin-type Li cells with the cathode material prepared by the method described in Example 3, the coin cells were analyzed in a constant current mode using a multi-channel battery tester. After 1 cycle at C/20 was completed, they were charged and discharged at a rate of C/2. The charging/discharging cycling tests of the cells were performed between 2.0 and 4.6 V at a current density of C/2 at 25° C. The discharge capacity was 180.9 mAh/g. The result of the charge/discharge test is shown in FIG. 3C.

Example 4

Preparation of Multi-Element Metal Hydroxide Particles

An aqueous solution was prepared by dissolving 80 g of nickel sulfate, 16 g of manganese sulfate and 29.5 g of cobalt sulfate in 1 L de-ionized water. Three metal sulfates were obtained from Aladdin Industries Corporation, China. An alkaline solution was prepared by dissolving 20.2 g of NaOH and 75.5 g of $NH_4OH$ in 5 L de-ionized water. The pH value of the alkaline solution was then adjusted to about 11.7 by an addition of NaOH and $NH_4OH$. To a glass reaction tank containing the stirring alkaline solution was added the aqueous solution by a diaphragm pump (obtained from Cole-Parmer, US) at a rate of 1 mL/second to obtain a suspension of multi-element metal (Ni—Mn—Co) hydroxide particles. The pH value was monitored and maintained at above 10 by an addition of $NH_4OH$.

Preparation of a Multi-Element Precursor

A solution of salts of metals was prepared by dissolving 20 g of Titanium(IV) sulfate ($Ti(SO_4)_2$), 9.8 g of aluminum sulfate ($Al_2(SO_4)_3$) and 3.2 g of lanthanum sulfate ($La_2(SO_4)_3$) in 1 L de-ionized water. Three metal sulfates were obtained from Aladdin Industries Corporation, China. To the suspension of multi-element metal hydroxide particles was slowly added the solution of the salts of the metals. A solid product comprising a precipitate of a mixture of titanium hydroxide, aluminum hydroxide and lanthanum hydroxide on the surface of the Ni—Mn—Co hydroxide particles was then obtained. The solid product was filtered from the suspension and then dried by a microwave dryer (model no. ZY-4HO, obtained from Zhiya Industrial Microwave Equipment Co., Ltd., Guangdong, China) at 2.45 GHz to obtain 98 g of a multi-element precursor.

Preparation of a Cathode Material

The multi-element precursor was mixed with 42.8 g of $Li_2CO_3$ powder (obtained from Aladdin Industries Corporation, China) by ball milling for 1 hour to obtain a first mixture. The first mixture was dispersed in 500 mL of deionized water to form a slurry. An ultrasonic probe (NP2500 from Guangzhou Newpower Ultrasonic Electronic Equipment Co., Ltd., China) with an input power of 200 W was used to homogenize the slurry for about 2.5 hours. The slurry was then dried by a microwave dryer of 2.45 GHz for about 15 minutes to obtain a solid mixture. The solid mixture was calcinated in a rotary furnace (model no. KY-R-SJQ130, obtained from Xianyang Institute of Ceramics Industry, Thermal Equipment Center, Shanxi, China) rotating with a speed of about 0.5 round per second in a flowing atmosphere containing about 40-45% oxygen at 750° C. for about 10 hours to obtain a calcinated product, where the temperature of the rotary furnace was increased from room temperature to 750° C. at a heating rate of 3° C./minute. The calcinated product was then cooled to room temperature at a rate from 3° C./minute to 5° C./minute. After cooling, the calcinated product was crushed by a jet mill (model no. LNJ-6A, obtained from Mianyang Liuneng Powder Equipment Co., Ltd., Sichuan, China) for about 1 hour, followed by passing through a 400 mesh sieve to obtain a metal (Ti,Al,La) oxide modified $Li_{1.05}Ni_{0.61}Mn_{0.19}Co_{0.21}O_2$ cathode material having an average particle size D50 of 14.5 μm, D10 of 6.8 μm, D90 of 19.6 μm and a specific surface area of 0.45 m$^2$/g obtained by the BET method.

Electrochemical Measurements

The electrochemical performance of the cathode material prepared by the method described in Example 4 was tested in CR2032 coin-type Li cells assembled in an argon-filled glove box. To fabricate the working electrode, a slurry was prepared by thoroughly mixing a solution of polyvinylidene fluoride (PVDF) dissolved in N-methyl-2-pyrrolidone (NMP) with the carbon black and cathode material. The slurry consisting of 94 wt. % cathode material prepared by the method described in Example 4, 3 wt. % carbon black, and 3 wt. % polyvinylidene fluoride was casted onto an aluminum foil as a current collector and dried at 80° C. under vacuum for 5 hours. After drying, the coated aluminum foil was cut into disc-form electrode for coin cell assembly. A metal lithium foil having a thickness of 500 μm served as a negative electrode. The electrolyte was a solution of $LiPF_6$ (1 M) in a mixture of ethylene carbonate (EC), ethyl methyl carbonate (EMC) and dimethyl carbonate (DMC) in a volume ratio of 1:1:1.

Figure 3D:
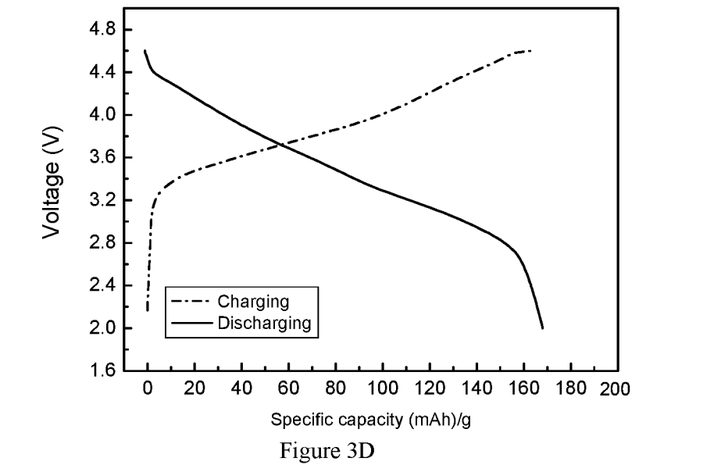

The coin cells were analyzed in a constant current mode using a multi-channel battery tester (BTS-4008-5V10 mA, obtained from Neware Electronics Co. Ltd, China). After 1 cycle at C/20 was completed, they were charged and discharged at a rate of C/2. The charging/discharging cycling tests of the cells were performed between 2.0 and 4.6 V at a current density of C/2 at 25° C. The discharge capacity was 168.1 mAh/g. The result of the charge/discharge test is shown in FIG. 3D.

Example 5

Assembling of Pouch-Type Full Lithium-Ion Batteries
Preparation of Positive Electrodes A positive electrode slurry was prepared by mixing 94 wt. % cathode material prepared by the method described in Example 1, 3 wt. % carbon black (SuperP; Timcal Ltd, Bodio, Switzerland) as a conductive agent, and 3 wt. % polyvinylidene fluoride (PVDF; Solef® 5130, Solvay S.A., Belgium) as a binder and then dispersing in N-methyl-2-pyrrolidone (NMP; >99% purity, Sigma-Aldrich, USA) to form a slurry with a solid content of 50 wt. %. The slurry was then uniformly spread onto an aluminum foil as a current collector using a doctor blade coater (model no. MSK-AFA-III, obtained from Shenzhen KejingStar Technology Ltd., China) and dried at 50° C. for 12 hours to obtain a cathode aluminum film.

Preparation of Negative Electrodes

A negative electrode slurry was prepared by mixing 90 wt. % of hard carbon (HC; 99.5% purity, Ruifute Technology Ltd., Shenzhen, Guangdong, China) with 5 wt. % polyvinylidene fluoride (PVDF) as a binder and 5 wt. % carbon black as a conductive agent and then dispersing in N-methyl-2-pyrrolidone to form another slurry with a solid content of 50 wt. %. The slurry was then uniformly spread onto a copper foil as a current collector using a doctor blade coater and dried at 50° C. for 12 hours to obtain an anode copper film.

Assembling of Pouch-Type Batteries

After drying, the resulting cathode film and anode film were used to prepare the cathode and anode respectively by cutting into pieces of square shape in the size of 6 cm×8 cm. The electrolyte was a solution of $LiPF_6$ (1 M) in a mixture of ethylene carbonate (EC), ethyl methyl carbonate (EMC) and dimethyl carbonate (DMC) in a volume ratio of 1:1:1. The coin cells were assembled in high-purity argon atmosphere with moisture and oxygen content <1 ppm. After electrolyte filling, the pouch cells were vacuum sealed and then mechanically pressed using a punch tooling with standard circular shape.

Electrochemical Measurements
Nominal Capacity

The cells were tested galvanostatically at a current density of C/2 at 25° C. on a multi-channel battery tester between 2.0 V and 4.6 V vs. Li$^+$/Li. The nominal capacity for each cell was about 5 Ah.

Cyclability Performance

Figure 4:
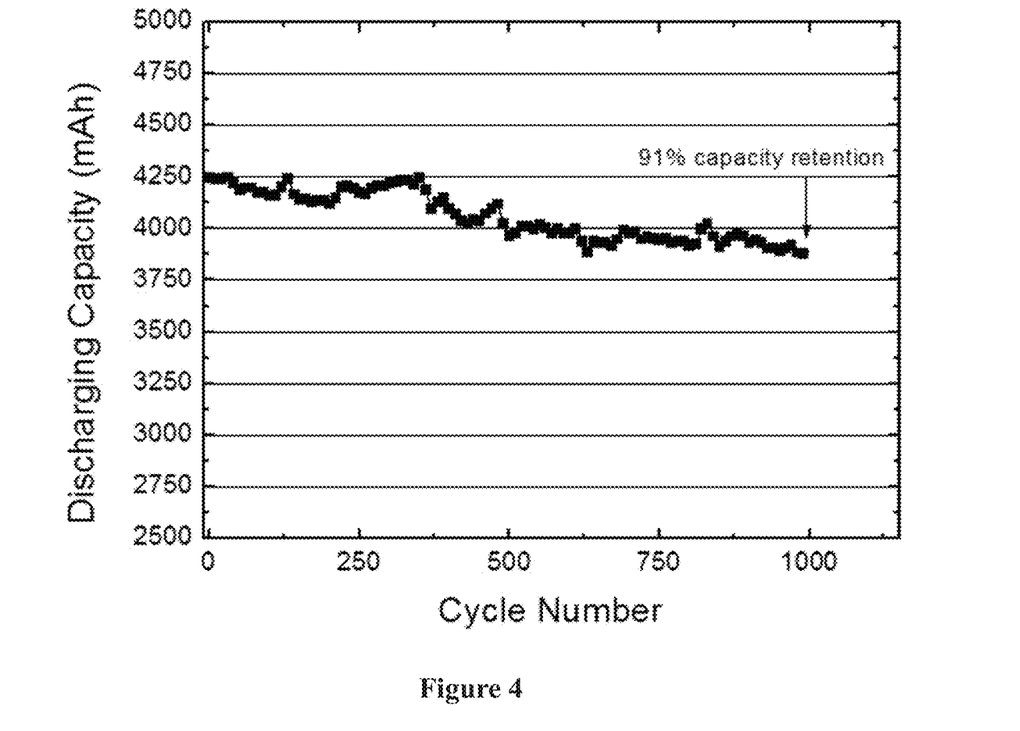
FIG. 4 depicts the cycling performance of a full lithium-ion battery cell with Example 1.

The cyclability performance of the pouch cell made of the cathode material prepared by the method described in Example 1 was tested by charging and discharging at a constant current rate of 1 C between 3.0 V and 4.3 V. Test result of cyclability performance is shown in FIG. 4. The capacity retention after 1000 cycles was about 91% of the initial value. This excellent cyclability is clearly due to the stability of the surface modified cathode material prepared by the method described in Example 1.

Nail Penetration Test

Figure 5:
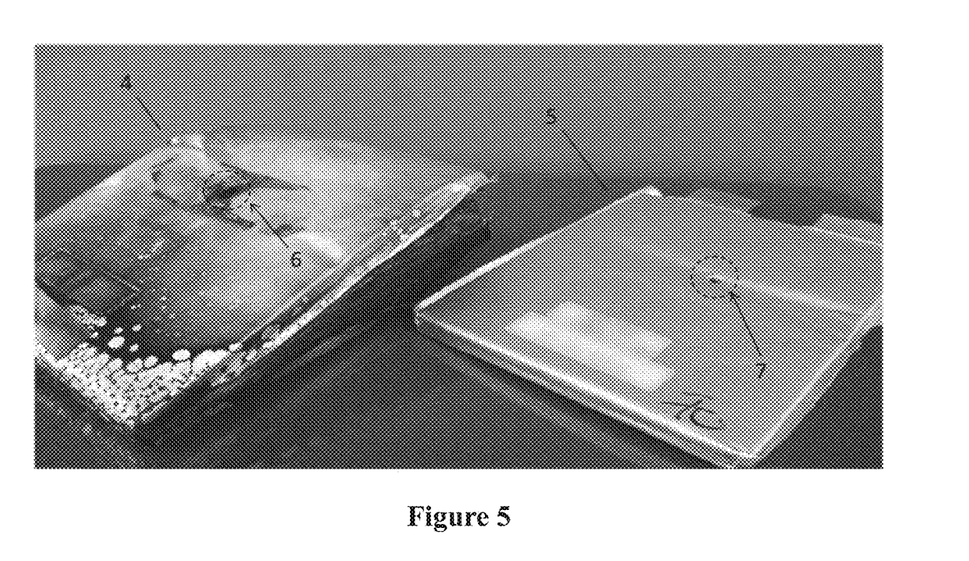
FIG. 5 depicts the nail penetration test results on 2 battery cells containing commercially available lithium multi-transition metal oxide cathode and Example 1 respectively.

Safety tests were conducted on a pouch cell made of the cathode material prepared by the method described in Example 1 and a commercial battery cell (obtained from Shandong Hengyu New Energy Co., Ltd., China) made of a multi-transition metal (Ni, Mn, Co) oxide cathode material. Both cells had the same capacity of 10 Ah and the size of 160 mm (L)×120 mm (W)×10 mm (T) and were in a state of charge above 95%. FIG. 5 shows the states of both cells after the nail penetration test, in which (4) is the commercial lithium multi-transition metal oxide cathode battery cell; (5) is the pouch cell made of the surface modified cathode material of the present invention; (6) is a punctured hole in battery cell (4); and (7) is a punctured hole in pouch cell (5). The nail penetration test for the pouch cell made of the cathode material prepared by the method described in Example 1 showed no generation of smoke or ignition, whereas the commercial battery cell suffered ignition immediately after penetration of nail. Therefore, a high level of safety with no smoke or ignition was achieved in the nail penetration test for the cell made of the cathode material of the present invention.

While the invention has been described with respect to a limited number of embodiments, the specific features of one embodiment should not be attributed to other embodiments of the invention. In some embodiments, the methods may include numerous steps not mentioned herein. In other embodiments, the methods do not include, or are substantially free of, any steps not enumerated herein. Variations and modifications from the described embodiments exist. The appended claims intend to cover all those modifications and variations as falling within the scope of the invention.

What is claimed is:

1. A cathode material for a lithium-ion battery cell, comprising lithium multi-metal composite oxide particles capped with a thin film of an oxide of a metal, wherein the lithium multi-metal composite oxide is represented by $Li_{1+z}Ni_xMn_yCo_{1-x-y}O_2$; and wherein z is from 0 to 0.2; x is from 0.35 to 0.8; y is from 0.1 to 0.45;

wherein the metal is one or more elements selected from the group consisting of Al, Ce, Fe, La, Mg, Mn, Ru, Sn, Ti, Zn, Zr and combinations thereof;

wherein the cathode material has a particle size D50 in the range from about 5 µm to about 15 µm; and     wherein the thin film of the oxide of the metal capped on the surface of the lithium multi-metal composite oxide particles has a thickness from about 500 nm to about 1 µm.

2. The cathode material of claim 1, wherein the lithium multi-metal composite oxide is $LiNi_{0.5}Mn_{0.3}Co_{0.2}O_2$, $LiNi_{0.6}Mn_{0.2}Co_{0.2}O_2$, $LiNi_{0.8}Mn_{0.1}Co_{0.1}O_2$ or combinations thereof.

3. The cathode material of claim 1, wherein the metal is one or more elements selected from the group consisting of Al, Ce, Fe, La, Mg, Mn, Ti, Zn, Zr and combinations thereof.

4. The cathode material of claim 1, wherein three or more elements are selected from the group consisting of Al, Ce, Fe, La, Mg, Mn, Ti, Zn, Zr and combinations thereof.

5. The cathode material of claim 1, wherein the thin film of the oxide of the metal capped on the surface of the lithium multi-metal composite oxide particles is selected from the group consisting of $Al_2O_3$, $CeO_2$, $Fe_2O_3$, $La_2O_3$, MgO, $MnO_2$, $TiO_2$, ZnO, $ZrO_2$ and combinations thereof.

6. The cathode material of claim 1, wherein the thin film of the oxide of the metal capped on the surface of the lithium multi-metal composite oxide particles is in the form of a continuous film that completely covers the surface of the lithium multi-metal composite oxide particles.

7. The cathode material of claim 1, wherein the thin film of the oxide of the metal capped on the surface of the lithium multi-metal composite oxide particles is in the form of a smooth and uniform film.

8. The cathode material of claim 1, wherein the cathode material has a particle size D50 in the range from about 12 µm to about 15 µm.

9. The cathode material of claim 1, wherein the cathode material has a particle size D50 in the range from about 12.5 µm to about 14.5 µm.

10. The cathode material of claim 1, wherein the cathode material has a particle size D10 in the range from about 6.8 µm to about 8.3 µm.

11. The cathode material of claim 1, wherein the cathode material has a particle size D90 in the range from about 19.3 µm to about 21.1 µm.

12. The cathode material of claim 1, wherein the cathode material has a specific surface area in the range from about 0.45 $m^2/g$ to about 0.66 $m^2/g$.

13. The cathode material of claim 1, wherein the molar ratio of the metal element Li to a total amount of the metal elements Ni, Mn, Co is 1.02-1.15 to 1.

14. The cathode material of claim 1, wherein the thin film capped on the surface of the lithium multi-metal composite oxide is coated by a wet coating method.

15. The cathode material of claim 1, wherein the cathode material exhibits a specific capacity in the range from about 150 mAh/g to about 200 mAh/g.

16. The cathode material of claim 1, wherein the cathode material exhibits a specific capacity in the range from about 156 mAh/g to about 180.9 mAh/g.

\* \* \* \* \*